(12) United States Patent
Zhang et al.

(10) Patent No.: US 7,913,184 B1
(45) Date of Patent: Mar. 22, 2011

(54) INTELLIGENT AUTO-TABBING SYSTEMS AND METHODS

(75) Inventors: Xi Zhang, Newton, MA (US); Robert E. Opaluch, Silver Beach, MA (US); Joel S. Angiolillo, Weston, MA (US); Elizabeth L. Fuller, Waltham, MA (US)

(73) Assignee: Verizon Laboratories Inc., Waltham, MA (US)

( * ) Notice: Subject to any disclaimer, the term of this patent is extended or adjusted under 35 U.S.C. 154(b) by 1253 days.

(21) Appl. No.: 11/039,105

(22) Filed: Jan. 20, 2005

(51) Int. Cl.
*G06F 17/00* (2006.01)
(52) U.S. Cl. ......... 715/780; 715/224; 715/858; 715/777
(58) Field of Classification Search .................. 715/224, 715/225, 226, 25, 780, 858, 777
See application file for complete search history.

(56) References Cited

U.S. PATENT DOCUMENTS

| | | | |
|---|---|---|---|
| 6,252,592 B1 * | 6/2001 | King et al. .................... | 715/764 |
| 2006/0026438 A1 * | 2/2006 | Stern et al. ................... | 713/184 |

OTHER PUBLICATIONS

IDocs Guide to HTML, 'Automatically Jumping to the Next Field', published 2002, pp. 1-2.*
DevX Developer Forum, VB Classic Text Boxes, WebMediaBrands Inc, Mar. 26, 2002, pp. 1-2.*

* cited by examiner

*Primary Examiner* — Stephen S Hong
*Assistant Examiner* — Matthew J Ludwig

(57) ABSTRACT

The invention relates to systems and methods for selectively auto-tabbing between input fields of an interface based on received input. More specifically, the intelligent auto-tabbing systems and methods accommodate different user preferences related to providing input by selectively auto-tabbing between fields based on user preferences. One example of a method according to one embodiment involves receiving an input character and entering the input character into a first field. The entry of that input character into the first field causes a number of characters in the first field to reach a predetermined threshold. A subsequent input character is received subsequent to that input character being entered into the first field. An input focus is positioned in a second field based on the subsequent input character.

11 Claims, 5 Drawing Sheets

INTELLIGENT AUTO-TABBING SYSTEMS AND METHODS

BACKGROUND OF THE INVENTION

The invention relates to systems and methods for selectively auto-tabbing between input fields of an interface based on received input. More specifically, the intelligent auto-tabbing systems and methods accommodate different user preferences related to providing input by selectively auto-tabbing between fields based on the input received.

People and organizations in general have come to rely on technology to communicate and share information more than ever before. The use of technology to share information often involves the inputting of information into a computing device. An interface is often provided to assist with the entry of information. For example, interfaces such as web forms are often presented to users over the Internet. When these forms are designed to receive input from users, the forms typically include a number of fields into which users can enter information.

Attempts have been made to make data entry into form fields convenient and efficient for a user. Two major existing approaches have been implemented to help a user navigate through the fields of a form. The first approach relies on the user manually navigating through the input fields. Typically, this is done by the user hitting the "Tab" key on a keyboard to go to the next field or using a mouse or other device to manually select a field. The second approach involves automatically and immediately moving a cursor to the next input field (this approach is often referred to as "auto-tabbing") as soon as the number of characters in the current input field equals a maximum length allowed in the current input field.

Each of these existing approaches has significant shortcomings. Manual navigation between separate fields is slow and cumbersome for some users because a keystroke or a mouse click must be manually entered each time the user desires to move to another field. This can quickly decrease efficiency, especially for users who enter large quantities of data into a computer interface (e.g., employees at a call center) and who expect to be able to move between fields without manual keystrokes or mouse commands.

While conventional auto-tabbing approaches seek to eliminate the need to manually move between fields, these approaches also have shortcomings. For example, users may easily become confused when they unexpectedly encounter a field having an auto-tab feature because the user often manually tabs forward in addition to an auto-tab event (i.e., a double-tab condition), thereby inadvertently jumping the cursor forward by an extra field. This causes users to unintentionally skip an input field, which tends to increase input errors. The user may continue to enter information without knowing that it is being entered into an incorrect field. This is especially true for visually impaired users or for users who prefer to enter data quickly without looking at the input form. Even if users discover errors caused by an auto-tab feature, additional time must be spent determining what went wrong and correcting the error.

The shortcomings of the two major existing approaches discussed above are exacerbated by their co-existence and their inconsistent use in data entry forms. When users enter information into form fields, the users often cannot tell without some trial and error whether an input field is configured to auto-tab. Auto-tabbing can also easily catch users off-guard because manual tabbing is generally more common. Even for forms with which users are familiar, typical users usually encounter many forms and may find it difficult to remember which fields and forms are equipped with auto-tabbing. Further, an input form having auto-tab fields mixed with manual-tab fields can also surprise users and lead to input errors.

Because different users have different preferences, some users prefer to manually move between fields, while other users prefer an auto-tab feature. These different preferences lead to different behaviors when inputting information into a form. The usability problems of the manual tab and the auto-tab approaches discussed above can lead to an unsatisfactory user experience with an input form. In turn, the users' unsatisfactory experiences may cause the provider of the input form to suffer a loss of business, reputation, or goodwill.

SUMMARY OF THE INVENTION

The invention relates to systems and methods for selectively auto-tabbing between input fields of an interface based on received input. More specifically, the intelligent auto-tabbing systems and methods accommodate different user preferences related to providing input by selectively auto-tabbing between fields based on the input received.

The systems and methods (collectively "system") provide a hybrid auto-tab function that is able to analyze input to interpret a user's preference for moving between fields and respond accordingly to accommodate the user's preference. The system is able to selectively auto-tab to another field based on the analysis of the input, thereby providing for auto-tabbing between fields when the input indicates a user's preference for auto-tabbing. The system is also able to recognize a user's preference for manual-tabbing and react accordingly to omit or correct auto-tab events that are not expected by the user.

One example of a method according to one embodiment involves receiving an input character and entering the input character into a first field. The entry into the first field causes a number of characters in the first field to reach a predetermined threshold. A subsequent input character is received subsequent to the input character being entered into the first field. An input focus is positioned in a second field based on the subsequent input character.

Another embodiment includes a hybrid tabbing method for moving an input focus between fields of an interface. This method includes steps of: receiving an input character; incrementing a count representative of a number of characters already in a first field; determining whether the incremented count is greater than a predetermined threshold representative of a maximum number of characters that can be entered into the first field; and selectively invoking an auto-tab function based on the determination.

Another method according to the invention involves receiving an input character, inserting the input character into a current field, determining whether the current field is full, auto-tabbing an input focus from the current field to another field if the current field is full, receiving a second input character after the auto-tab to the other field, recognizing a double-tab condition based on the second input character, and compensating for the double-tab condition. The compensation includes positioning the input focus in an appropriate field, which can be performed by ignoring or reversing the second input character whenever it includes a manual tab command received immediately following an auto-tab action.

Another embodiment includes a method for implementing a selective auto-tabbing feature for moving between fields of an interface. This method includes steps of: providing a plurality of fields associated with the interface, wherein the plurality of fields includes a current field and a next field; setting a maximum length attribute for the current field, wherein the maximum length attribute represents a maximum number of characters that can be inserted into the current field; and configuring a condition, a satisfaction of which causes an input focus to automatically move to the next field. The condition is satisfied when the sum of a number of characters already in the current field plus a received input character is greater than the maximum length attribute.

Yet another embodiment includes a computer-readable medium including instructions for directing a computer to perform the steps of: receiving an input character; entering the input character into a first field, the entry causing the number of characters in the first field to reach a predetermined threshold; receiving a subsequent input character subsequent to the input character being entered into the first field; and positioning an input focus in a second field based on the subsequent input character.

An example of a system for selectively auto-tabbing between fields of an interface according to one embodiment includes an input subsystem for receiving a number of input characters. The input characters include a first input character and a subsequent input character received subsequent to the first input character. A tabbing subsystem provides for: entering the first input character into a first field, the entry causing a number of characters in the first field to reach a predetermined threshold; and positioning an input focus in a second field based on a subsequent input character.

The present invention will be more fully understood upon reading the following detailed description in conjunction with the accompanying drawings.

BRIEF DESCRIPTION OF THE DRAWINGS

The accompanying drawings illustrate various embodiments of the present invention and are a part of the specification. The illustrated embodiments are merely examples of the invention and do not limit the scope of the invention. Throughout the drawings, identical reference numbers designate identical or similar elements.

DETAILED DESCRIPTION

I. Overview

Figure 1:
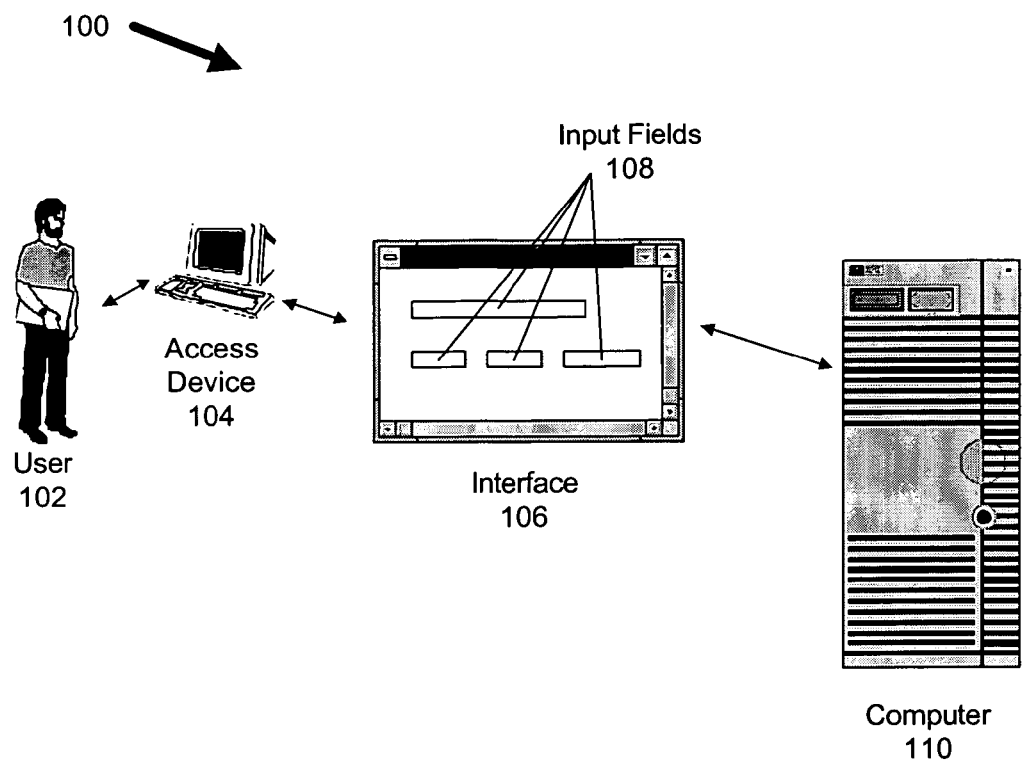
FIG. 1 is an environmental view of a particular application of an intelligent auto-tabbing system according to one embodiment.

The invention relates to systems and methods (collectively "system") for selectively auto-tabbing between input fields of an interface based on received input. More specifically, the intelligent auto-tabbing systems and methods accommodate different user preferences related to providing input by selectively auto-tabbing between fields based on the input received. The system's hybrid auto-tabbing features can help reduce input errors and increase efficiency by accommodating different behaviors for entering information into input fields.

With the selective auto-tabbing system, users are more likely to have satisfactory experiences with input forms regardless of the users' particular preference for entering information. On one hand, users who prefer an auto-tab function will be able to quickly and accurately enter information without having to manually tab through fields. For example, an employee at a call center who enters large quantities of information will save time by being able to enter data without having to traverse the fields manually. On the other hand, users who prefer to manually move between fields will not be surprised by the input focus unexpectedly jumping to a different field due to an unexpected auto-tab.

Because many interfaces are configured to respond to a "Tab" keystroke by moving an input focus from one field to another field, the word "tab" is used throughout the specification and the claims to refer to an action of moving an input focus (e.g., a cursor) from one field to another. However, use of the word "tab" to describe this action is not limited to instances in which the "Tab" key is used to initiate the action. In other words, the terms "tab" or "tabbing" encompass any movement of an input focus between fields (i.e., a navigation event). Examples of actions that may be used to navigate an input focus between fields include but are not limited to speaking a keyword in a voice recognition application, moving eye fixation with an eye-tracking application, gesturing to a gesture recognition application, and performing or providing any other command that is recognizable by an application as an indication that a user intends to move to another input field or input event.

The term "manual tab" (or "manual tabbing") is used throughout the specification and the claims and is meant to refer to any movement of the input focus from one field to another that is caused by a user's action. In many interfaces for example, the user can move a cursor from one field to another by pressing the "Tab" key or by issuing a mouse, stylus, or other similar command.

Throughout the specification and the claims, the term "auto-tab" (or "auto-tabbing") is meant to be understood broadly as any movement of the input focus from one field to another that is caused by system action. For example, the system can cause the input focus of an interface to move from one field to another automatically based on field attributes and/or input received in the fields. Circumstances in which the system selectively invokes an auto-tab function are described in detail below.

II. Introduction of Elements

FIG. 1 is an environmental view of a particular application of an intelligent auto-tabbing system 100. As shown in FIG. 1, a user 102 can use an access device 104 to access an interface 106 having input fields 108. The interface 106 is generated and controlled by a computer 110. Through the access device 104, the user 102 can enter information (e.g., input characters) into the input fields 108 of the interface 106.

A. Character

Throughout the specification and the claims, a character is meant to be defined broadly as any character that can be entered into the system 100 by the user 102. Characters can include alphanumeric characters, pictorial characters, pictographs, graphical elements, pictures, an indication of emotion or choice, and other forms of data information.

B. User

The user 102 is typically a human being who can utilize the access device 104 to input information into the system 100. However, the user 102 may be another living organism, an automated agent, or some form of intelligence technology that is configured to provide input to the system 100.

C. Access Device

The access device 104 can include any device that allows users 102 to provide input to or otherwise access the system 100 via the interface 106. For example, the access device 104 can include but is not limited to desktop computers, laptop computers, personal data assistants, cellular telephones, satellite pagers, wireless internet devices, embedded computers, video phones, mainframe computers, mini-computers, programmable logic devices, microwave ovens, vehicles, bathroom shower controls, entertainment devices, gaming devices, and other future devices that may not yet currently exist. The access device 104 can also include various peripherals such as a terminal, keyboard, mouse, screen, printer, stylus, input device, output device, or any other apparatus that can help relay information between users 104 and the interface 106.

D. Interface

Through the access device 104, the interface 106 is presented to users 102 as a means for communicating with the computer 110. The interface 106 includes means for prompting for and receiving input from users 102. In a preferred embodiment, the interface 106 is a graphical user interface ("GUI") capable of displaying a number of input fields 108. Users 102 can populate the input fields 108 with input data. For example, the users 102 can type or otherwise enter characters into the input fields 108. In some embodiments, the interface 106 is a web form. However, the interface 106 is not limited to a web form embodiment and can include many different types of interfaces 106 that use input fields 108 to receive input from users 102. For example, the interface 106 may include any graphical user interface associated with a software program. The interface 106 may include voice recognition, eye tracking, gesture recognition, pattern recognition, and/or thought recognition applications.

E. Input Fields

Figure 2:
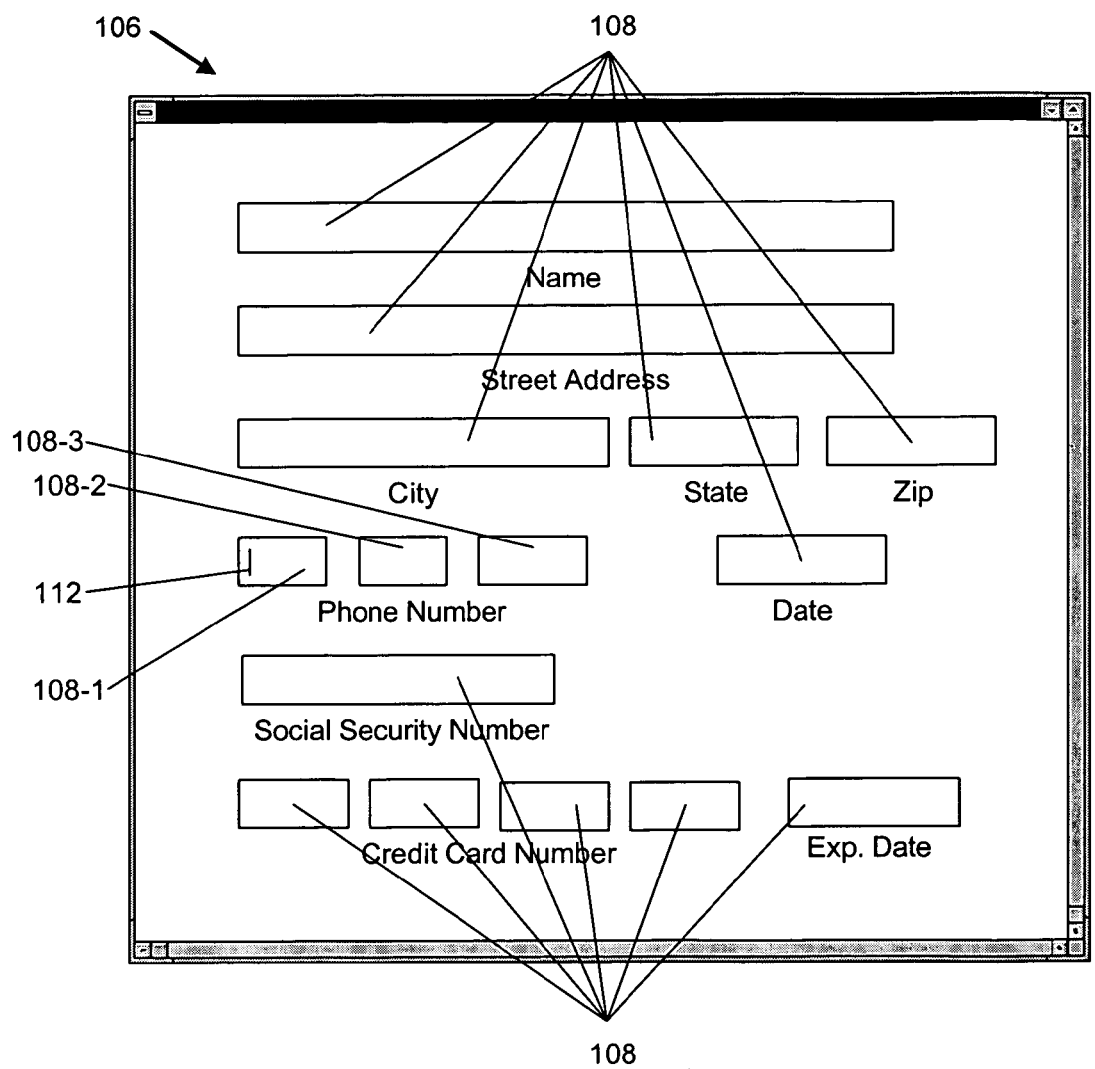
FIG. 2 illustrates an example of an interface for receiving input and implementing intelligent auto-tabbing methods according to one embodiment.

The input fields 108 of the interface 106 are presented to users 102 and may prompt the users 102 for information. FIG. 2 shows one embodiment of an interface 106 having input fields 108 for receiving input. The input fields 108 can be configured to receive different categories of information, including but in no way limited to a name, a street address, a city, a state, and zip code, a phone number, a date, a social security number, a credit card number, and an expiration date for the credit card. The input fields 108 may also include, for example, requests for an action, a direction change, an emotional reaction, an indication of a choice or preference, a search term, a quantity, and any other type of data (e.g., pictorial or graphical data).

Combinations of input fields 108 can also be configured to receive a particular type of input. For example, FIG. 2 shows that a number of input fields 108 can be configured to receive input characters representative of a phone or credit card number.

In FIG. 2, three fields 108-1, 108-2, and 108-3 are shown for receiving data that together makes up a telephone number. These three fields 108-1, 108-2, 108-3 are labeled 108-1, 108-2, and 108-3 to aid the description of an exemplary auto-tabbing processes discussed below. The field 108-1 includes an input focus 112 and is referred to as the current field 108-1. The field 108-2 is referred to as the next field 108-2 (or the first next field 108-2) because it directly follows current field 108-1, which means that a tab command will move the input focus 112 from the current field 108-1 to the first next field 108-2. Field 108-3 is referred to as the second next field 108-3 because two tab commands would move the input focus 112 from the current field 108-1 to the second next field 108-3.

The input focus 112 is located in a particular field 108 to direct entry of information into that same field 108. The input focus 112 is preferably presented to the user 102 as an indication of the field 108 that will generally receive any entered data. While the input focus 112 can include any place marker that indicates where data will be entered, usually it is a cursor.

The input fields 108 can have attributes associated with them. One type of attribute that may be assigned to fields 108 is used to define what types of data the fields 108 will accept. For example, some fields 108 may be configured for textual data, other fields 108 for numerical data, and other fields 108 for both textual and numerical data. In the exemplary interface 106 shown in FIG. 2 for example, the name field 108 can be configured to accept textual data, the street address field 108 can be configured to accept both textual data and numerical data, and the phone number fields 108 can be configured to accept numerical data. It is also anticipated that the fields 108 can be configured to accept other specific or predefined groups of characters as input, or other types of input other than or in addition to characters.

Characters that are defined to be acceptable by a particular field 108 can be referred to as "valid" characters. On the other hand, characters that are defined to be unacceptable by a particular field 108 can be referred to as "invalid" characters. In addition, "special" characters may be defined a particular field 108. Special characters may include command instructions, e.g., "Escape" and/or "Tab," that cause a special event to be executed. For example, field 108 attributes can be defined such that a "Tab" character will cause instructions to be executed that instantiate a navigation event to another field 108 (i.e., a manual tab).

Fields 108 can also be assigned a maximum length attribute. Fields 108 with maximum lengths are often referred to as "fixed-length fields.". Fixed-length fields 108 are especially useful for data that is of uniform length. For example, the social security number field 108 shown in FIG. 2 may be configured to have a maximum length value of nine because social security numbers in the United States consist of nine numbers. This means that where the maximum field length is defined as a maximum number of characters that can be accepted into a particular field 108; the social security number field 108 will accept no more than nine characters. Credit card numbers are another example of data that typically have a uniform length. Because credit card numbers commonly consist of sixteen numerical characters, a maximum length value for a credit card input field 108 could be set to sixteen. The field 108 could then accept no more than sixteen characters. Alternatively, four fields 108 each having a maximum length value of four characters could be arranged to accept a credit card number as shown in FIG. 2.

Those skilled in the art will recognize that a field 108 can be configured to recognize and count the number of "valid" characters that have been inputted for a particular field 108. Fields 108 can also be configured to not count "special" characters (e.g., "Tab") or "invalid" characters toward the number of characters in the particular field 108.

While FIG. 2 illustrates a number of exemplary types of input fields 108 that can be associated with the interface 106, many other types of input fields 108 can be used by the system 100 to receive information. Further, the input fields 108 can be tailored to fit any application of the system 100. In one embodiment, the input fields 108 include a number of fixed length fields 108 displayed as part of a data entry form (e.g., a web page). As users 102 enter information into the fields 108, the system 100 analyzes the users' 102 data inputting behavior and invokes hybrid auto-tabbing processes designed to help reduce data entry errors. Other input fields 108 can accept graphical elements, pictures, videos, utterances, and/or indicators of emotion or thought.

F. Computer

Returning now to FIG. 1, the computer 110 can include any device or combination of devices that allows the processing of the system 100 to be performed. The computer 110 may be a general purpose computer capable of running a wide variety of different software applications or a specialized device limited to particular functions. In some embodiments, the computer 110 is the same device as the access device 110. In other embodiments, the computer 110 is a network of computing devices accessed by the accessed device 110. The computer 110 may include any type, number, form, or configuration of processors, system memory, computer-readable mediums, peripheral devices, and operating systems. The computer may also include bio-computers or other intelligent device (e.g., artificially intelligent device). In many embodiments, the computer 110 is a server and the access device 104 is a client device accessing the server.

The computer 110 is capable of executing steps for performing the functionality of the system 100, including generating and controlling the interface 106 and interactions of the interface 106 with users 102. In particular, the computer 110 can generate and present input fields 108 to users 102, as well as process the input received through the interface 106. The computer 110 can analyze the input and act based on analyses of the input.

The functionality of the system 100 can be embodied or otherwise carried on a medium that can be read by the computer 110. The medium carrying the instructions (e.g., software processes) of the system 100 can be part of or otherwise communicatively coupled to the computer 110. In preferred embodiments, the instructions are configured to cause the computer 110 to perform the steps of the exemplary methods disclosed below.

While an exemplary implementation of the system 100 is shown in FIG. 1, those skilled in the art will recognize that the exemplary environment components illustrated in the Figure are not intended to limit the present invention. Indeed, those skilled in the art will recognize that other alternative hardware environments may be used without departing from the scope of the present invention.

III. Process Flow Views

A. Example 1

Figure 3:
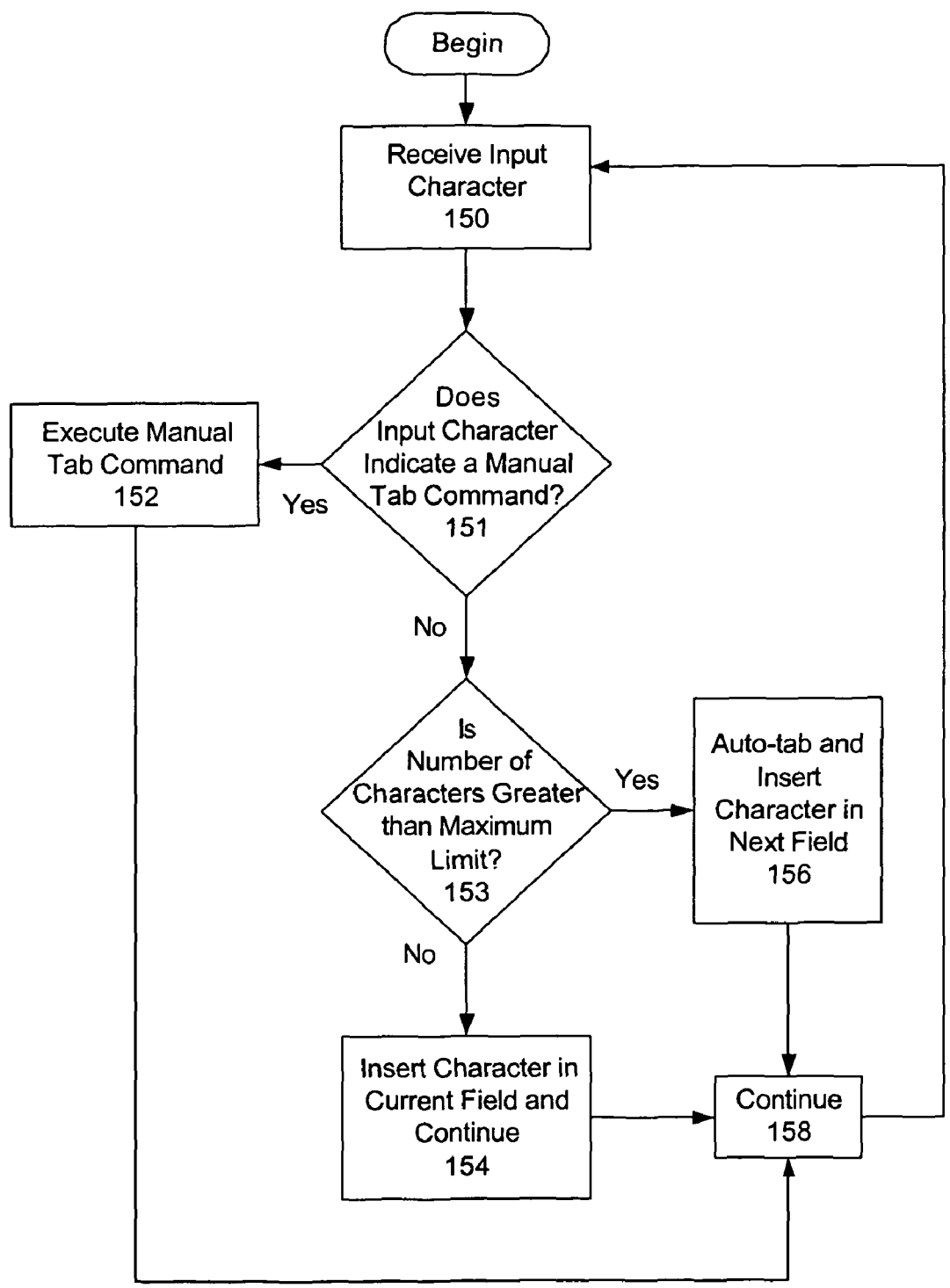
FIG. 3 is a flowchart diagram illustrating an example of a process for selectively auto-tabbing between fields based on received input according to one embodiment.

FIG. 3 is a flowchart diagram illustrating an example of a hybrid auto-tab process for selectively auto-tabbing between fields 108 based on received input.

At step 150, an input character is received. Typically, the input character is provided by or imported from the user 102.

At step 151, it is determined whether the input character indicates a manual tab command (e.g., a "Tab" keystroke). If it is determined at step 151 that the input character does indicate a manual tab command, processing moves to step 152. At step 152, the manual tab command is executed to move the input focus 112 to another field 108 (e.g., from the current field 108-1 to the next field 108-2). Processing then continues 158 to step 150, at which step another input character can be received.

On the other hand, if it is determined at step 151 that the input character does not indicate a manual tab command, processing moves to step 153. At step 153, the system 100 determines whether the received character will be added to the current field 108-1, which is the field 108 in which the input focus 112 is currently located. In the embodiment shown in FIG. 3, step 153 includes determining whether the received character will increase the number of characters already in the current field 108-1 to a value greater than the predefined maximum allowable length of the same field 108-1. One way to make this determination is to compare the sum total of the number of characters already in the current field 108-1 plus the received character with the current field's 108-1 predefined maximum length value. In other words, increment the count of the number of characters in the field by one for the received input character and compare the incremented count with the predefined maximum length value of the current field 108-1. If this total number of characters is not greater than the maximum length value, then processing continues at step 154, where the received character will be added to the current field 108-1. Processing then continues 158 to step 150 for the next received character.

One the other hand, if it is determined at step 153 that the total number of characters (which includes the received input character) is greater than the current field's 108-1 maximum allowable numbers of characters, then the received character will not be added to the current field 108-1. Processing then jumps to step 156, where the system 100 auto-tabs the input focus 112 to the next field 108-2. At step 156, the received character is inserted into the next field 108-2. Processing then continues 158 to step 150 for the next received input character.

Other conditional statements may be used at step 153 to determine whether the received character will be added to the current field 108-1 at step 152. For example, if the number of characters already in the current field 108-1 is equal to the maximum allowable length, then the system 100 will recognize that the received character will not be added to the current field 108-1 because there is no space available.

By auto-tabbing when the received character will increase the number of characters to a value greater than a maximum character limit (rather than auto-tabbing when the previous character brought the number of character in the field 108 to equal a maximum limit), the system 100 reduces input errors. Specifically, the system 100 waits until after a field 108 is full to determine whether to auto-tab. This provides users 102 time to manually tab before an auto-tab event is executed, thereby avoiding double tab conditions when users 102 prefer to manually tab through the fields 108. In particular, users 102 that prefer to manually tab between fields 108 usually hit the "Tab" key after filling a field 108 (i.e., when the received character is added to the field to bring the number of characters in the field 108 to equal the maximum number of characters allowed for the field 108). When the user 102 manually tabs upon filling the current field 108-1, the system 100 does not invoke an auto-tab because the user 102 manually tabbed to the next field 108-2 before the number of characters in the current field 108-1 could increase to a value greater than the maximum allowable length.

The system 100 also accommodates user 102 preferences for auto-tabbing. If users 102 do not input a manual tab command when the field 108 is full (or before the field is full), the system 100 can be configured to auto-tab to another field 108 upon receipt of an input character that increases the number of characters for a field 108 to a value greater than the predefined maximum for the same field 108. Thus, if a particular user 102 keeps typing characters in reliance on an auto-tab feature, the system 100 auto-tabs between fields 108 and places the received characters into the appropriate fields 108. In other words, according to one embodiment, the system 100 can be configured to auto-tab when an input character is received subsequent to the field 108 reaching its maximum number of characters with the previous character.

By auto-tabbing when it is determined that the received character will not be added to the current field 108-1, the system 100 reduces input errors that could otherwise result from an auto-tab to another field. Accordingly, the system 100 accommodates preferences for both manual-tabbing and auto-tabbing, as well as preferences for interchangeably using auto-tab and manual-tab techniques to navigate between fields 108.

The next input field 108-2 may or may not imply a sequentially ordered set of fields. The next field 108-2 may be reached by sequential order, by the content of the current field 108-2 determining the next field 108-2, by the computer 110 dynamically determining the order of input fields 108, by actions of the user 102, or by other determinations of the ordering of input fields 108.

Note that in alternative embodiments, other criteria besides the maximum number of allowable characters may be used to determine whether to navigate to another input field 108. For example, pauses greater than a predetermined amount of time in a voice recognition input application can be used to trigger a navigation event. Another example includes the use of a semantic word or sentence recognition algorithm to determine that an input field 108 has been completed.

B. Example 2

Figure 4:
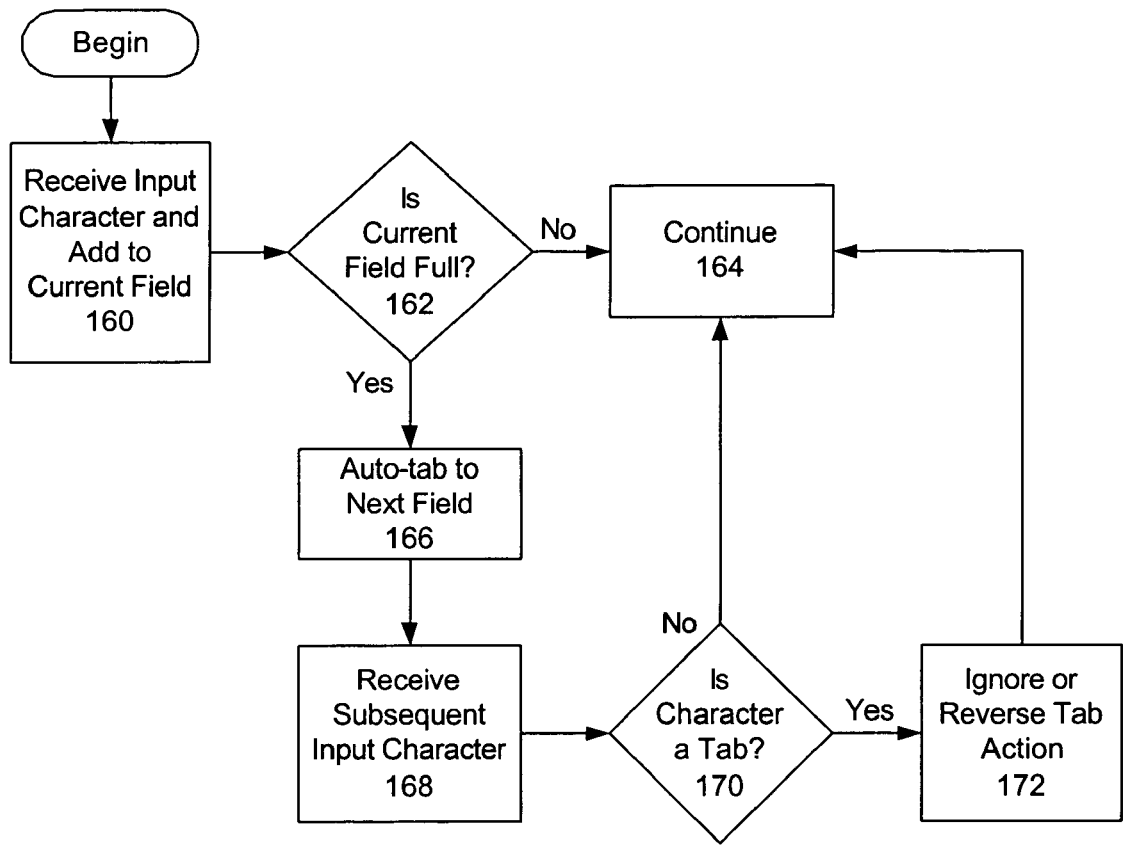
FIG. 4 is a flowchart diagram illustrating another example of a process for selectively auto-tabbing between fields based on received input according to another embodiment.

FIG. 4 is a flowchart diagram illustrating another example of a process for selectively auto-tabbing between fields 108 based on received input.

At step 160, an input character is received and added to the current field 108-1. Typically, the input character is provided by or imported from the user 102.

At step 162, the system 100 determines whether the current field 108-1 is full. In other words, after the addition of the input character to the current field 108-1 at step 160, the system 100 determines whether the number of characters in the current field 108-1 has reached the maximum field length value for the same field 108-1. If the current field 108-1 is not full, then processing continues at step 164 without invoking an auto-tab action. When additional character input is received, processing begins again at step 160.

On the other hand, if the current field 108-1 is full at step 162 (i.e., the received character brought the number of characters in the current field 108-1 to equal a predefined maximum limit for the same field 108-1, processing moves to step 166, where an auto-tab action is performed to automatically move the input focus 112 from the current field 108-1 to the next field 108-2. Processing then continues at step 168, where a subsequent input character is received. The subsequent character is the first input character received immediately following the auto-tab at step 166. In other words, the subsequent character is the next character received after it has been determined that the number of characters in a particular field, such as field 108-1, equals the maximum limit for that same particular field (in this example, field 108-1).

Processing then moves to step 170, where the system 100 determines whether the subsequent character received at step 168 is a manual tab command, e.g., a "Tab" character. If it is not a manual tab command, processing continues at step 164, where the second input character is added to the next field 108-2. When additional character input is received, the process begins again at step 160.

On the other hand, if at step 170 it is determined that the character received at step 168 is a manual tab command, then processing moves to step 172, where the process compensates for the manual tab command. For example, the manual tab command may be either ignored or reversed. If the manual tab command is ignored, then the input focus 112 remains at the next field 108-2. If the reverse tab action is used, then the received manual tab command moves the input focus 112 to the second next field 108-3, but the process moves the input focus 112 back to the first next field 108-2 by reversing the auto-tab action. Thus, the system 100 is configured to ignore or reverse any manual tab command that immediately follows an auto-tab action. After ignoring or reversing a manual tab at step 172, processing continues at step 164. When additional character input is received, the process begins again at step 160.

By watching for a manual tab command immediately following an auto-tab event, the system 100 is able to recognize and alleviate situations (i.e., double-tab conditions) where users 102 did not expect the auto-tab function and manually tabbed forward in addition to the auto-tab. The system 100 prevents these and other situations from causing further mistakes by placing the input focus 112 at the intended field 108-2 rather than allowing the input focus 112 to inadvertently jump forward to an extra field, which would be field 108-3 in this example.

IV. Subsystem-Level View

Figure 5:
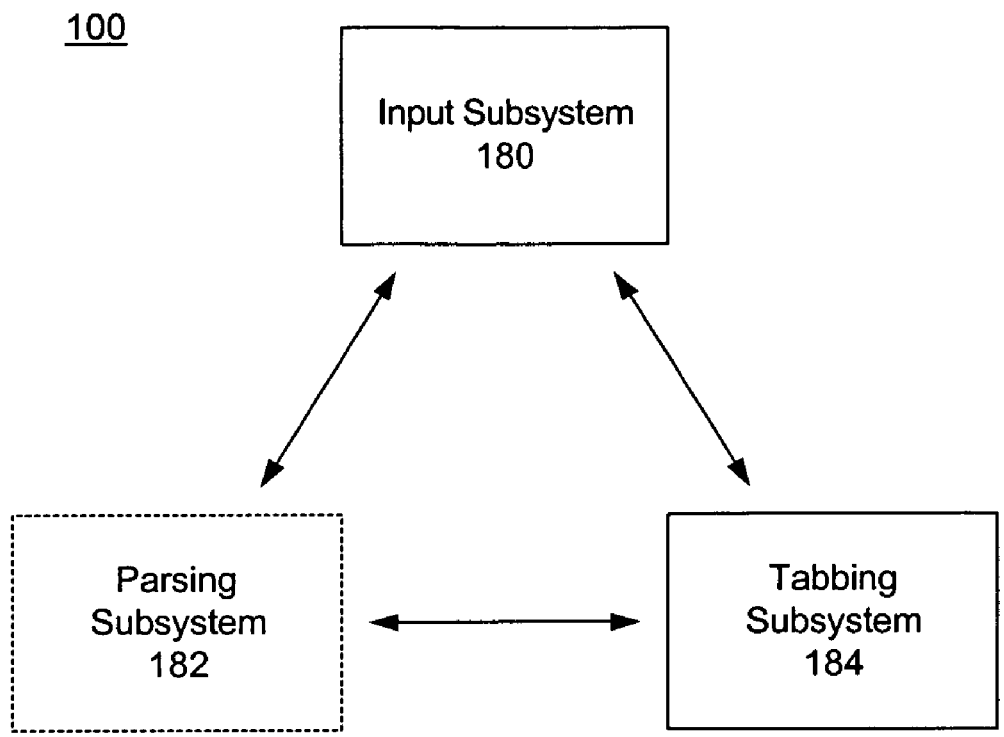
FIG. 5 is a subsystem-level view of an example of an auto-tabbing system.

FIG. 5 is a subsystem-level view of an example of an auto-tabbing system 100. As shown in the Figure, the system 100 can include an input subsystem 180, a parsing subsystem 182, and a tabbing subsystem 184.

A. Input Subsystem

The input subsystem 180 can be configured to receive input characters. The input subsystem 180 can include the interface 106, the input fields 108, the input focus 112, and any other means for controlling input and output between the system 100 and the user 102. The input subsystem 180 is able to make any input received available to the parsing subsystem 182.

B. Parsing Subsystem

The parsing subsystem 182 parses the input characters and identifies any special characters (e.g., backspace, tab, etc.). The parsing subsystem 182 is also configured to identify characters that can be added to the current field 108-1. The parsing subsystem 182 is represented by dashed lines because it is optional to the system 100. For example, the parsing subsystem 182 can be implemented as part of the input subsystem 180 or the tabbing subsystem 184.

C. Tabbing Subsystem

The tabbing subsystem 184 is able to recognize tab commands and situations based on the received input. The tabbing subsystem 182 causes the input focus 112 to move between separate fields 108 when it recognizes a proper tab command or situation. To recognize and act upon tab situations, the tabbing subsystem 184 may utilize any of the process steps discussed above. Thus, the tabbing subsystem 184 controls the placement of the input focus 112 based on the input received.

The input subsystem 180, parsing subsystem 182, and tabbing subsystem 184 are preferably configured to work together to recognize and accommodate user preferences or behaviors related to entering information into input fields 108 by analyzing the input received from the users 102. The system 100 is then able to reduce input errors and user frustration by tailoring tab commands to fit the identified user preferences, thereby placing the input focus 112 in an appropriate input field 108.

V. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope.

The above-described steps of FIGS. 3 and 4 may be implemented as software, hardware, firmware, and other known forms of computer-readable instructions. The methods of FIGS. 3 and 4 may be stored as computer-readable instructions in random access memories, read-only memories (e.g., CD-ROMs), optical storage devices, application-specific devices (e.g., application-specific integrated circuits), and any other known medium or device capable of storing computer-readable instructions.

The above-described methods may be implemented in operating systems, applications software, and any other computer program that is capable of receiving input. In particular, the methods may be implemented in applications software for collecting input data and populating input fields with the data. In one embodiment, the above-described methods are implemented using Javascript to configure a web form for data entry in accordance with the present invention. The web form may be configured with fields for receiving a telephone number in accordance with the methods described above. Other known programming languages may also be used to implement the above described methods.

It is intended that the scope of the invention be defined by the following claims.

What is claimed is:

1. A method of reducing errors associated with data entry into fields, the method comprising:
    receiving an input character by a first field, said first field having an input focus and including a maximum number of characters that can be entered into said first field according to a maximum length attribute for said first field, wherein said maximum length attribute represents a maximum number of characters that can be inserted into said first field;
    determining whether said input character is a manual tab character; and
    if said input character is not a manual tab character:
        performing an auto-tab function by positioning said input focus from said first field to a second field,
        entering said input character into said second field, and
        if said input character is a manual tab command, positioning said input focus in said second field by executing said manual tab command.

2. A hybrid tabbing method for moving an input focus between fields of an interface, the method comprising:
    receiving an input character;
    incrementing a count representative of a number of characters already in a first field without the entry of said input character into said first field;
    determining whether said incremented count is greater than a predetermined threshold representative of a maximum number of characters that can be entered into said first field according to a maximum length attribute for said first field, wherein said maximum length attribute represents a maximum number of characters that can be inserted into said first field; and
    selectively invoking an auto-tab function based on said determination.

3. The method of claim 2, wherein said auto-tab function is invoked if it is determined that said incremented count is greater than said predetermined threshold.

4. The method of claim 2, wherein said auto-tab function is omitted if it is determined that said incremented count is not greater than said predetermined threshold.

5. The method of claim 2, wherein said input character is omitted from said first field if said incremented count is greater than said predetermined threshold.

6. The method of claim 2, wherein said input character is entered into said first field if said incremented count is not greater than said predetermined threshold.

7. The method of claim 2, wherein said auto-tab function includes moving an input focus to a second field.

8. A method of selectively moving between fields of an interface to accommodate different user preferences for entering information, comprising:
    receiving an input character;
    inserting said input character into a current field;
    determining whether said current field is full according to a maximum length attribute for said current field, wherein said maximum length attribute represents a maximum number of characters that can be inserted into said current field;
    auto-tabbing an input focus from said current field to a next field if said current field is full;
    receiving a second input character after said auto-tab;
    recognizing a double-tab condition based on said second input character being a manual tab command; and
    compensating for said double-tab condition by one of ignoring said manual tab command, reversing said manual tab command, and reversing said auto-tabbing based on said recognition.

9. The method of claim 8, wherein said second input character is received immediately after said auto-tab.

10. A computer-readable medium including instructions for directing a computer to perform the steps of:
    receiving an input character by a first field, said first field having an input focus and including a maximum number of characters that can be entered into said first field according to a maximum length attribute for said first field, wherein said maximum length attribute represents a maximum number of characters that can be inserted into said first field;
    determining whether said input character is a manual tab character; and
    if said input character is not a manual tab character:
        performing an auto-tab function by positioning said input focus from said first field to a second field,
        entering said input character into said second field, and
        if said input character is a manual tab command, positioning said input focus in said second field by executing said manual tab command and omitting invoking an auto-tab function.

11. A system for selectively auto-tabbing between fields of an interface, comprising a computer configured to provide:
    an input subsystem configured to receive a plurality of input characters, said plurality of input characters including an input character; and
    a tabbing subsystem configured to:
        receive said input character by a first field, said first field having an input focus and including a maximum number of characters that can be entered into said first field according to a maximum length attribute for said first field, wherein said maximum length attribute represents a maximum number of characters that can be inserted into said first field;

determine whether said input character is a manual tab character; and if said input character is not a manual tab character:
   perform an auto-tab function by positioning said input focus from said first field to a second field, enter said input character into said second field, and if said input character is a manual tab command, positioning said input focus in said second field by executing said manual tab command.

\* \* \* \* \*